(12) United States Patent
Wieczorek

(10) Patent No.: US 6,318,942 B1
(45) Date of Patent: Nov. 20, 2001

(54) LUG CAP HAVING RETENTION DETENTS

(75) Inventor: Ted John Wieczorek, Rochester Hills, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 09/640,147

(22) Filed: Aug. 16, 2000

(51) Int. Cl.[7] .............................. F16B 19/00; F16B 37/14
(52) U.S. Cl. .......................... 411/431; 411/429; 411/374; 411/910; 301/37.37
(58) Field of Search .................................. 411/374, 429, 411/431, 910; 301/37.37

(56) References Cited

U.S. PATENT DOCUMENTS

| 2,545,130 | 3/1951 | Ash . |
| 3,653,719 | 4/1972 | Osawa et al. . |
| 4,382,635 | 5/1983 | Brown et al. . |
| 4,842,339 | 6/1989 | Roulinson . |
| 4,895,415 | 1/1990 | Stay et al. . |
| 4,968,202 | 11/1990 | Lanham . |
| 4,998,780 | 3/1991 | Eshler et al . |
| 5,082,409 | 1/1992 | Bias . |
| 5,163,739 | 11/1992 | Stanlake . |
| 5,181,767 | 1/1993 | Hudgins et al. . |
| 5,193,884 | 3/1993 | Sheu et al. . |
| 5,205,614 | 4/1993 | Wright . |
| 5,249,845 | 10/1993 | Dubost . |
| 5,286,092 | 2/1994 | Maxwell, Jr. . |
| 5,286,093 | 2/1994 | Wright . |
| 5,294,189 | 3/1994 | Price et al. . |
| 5,380,070 | 1/1995 | FitzGerald . |
| 5,503,465 | 4/1996 | Price et al. . |
| 5,520,445 | 5/1996 | Toth . |
| 5,595,422 | 1/1997 | Ladouceur . |
| 5,667,281 | 9/1997 | Ladouceur . |
| 5,707,113 | 1/1998 | Russell . |
| 5,752,794 | * 5/1998 | Krawczak ............................ 411/374 |

* cited by examiner

Primary Examiner—Neill Wilson
(74) Attorney, Agent, or Firm—Bliss McGlynn & Nolan, P.C.

(57) ABSTRACT

A lug cap includes a detent along the inner wall. The detent has an engaging surface that begins shortly after a threaded portion of the lug cap ends. The engaging surface ramps up to a top surface that runs parallel to the inner wall. The lug nut engages the detent which prevents the rotation of the lug cap with respect to the lug nut by increasing the force required to loosen or tighten the lug cap from the lug nut.

9 Claims, 2 Drawing Sheets

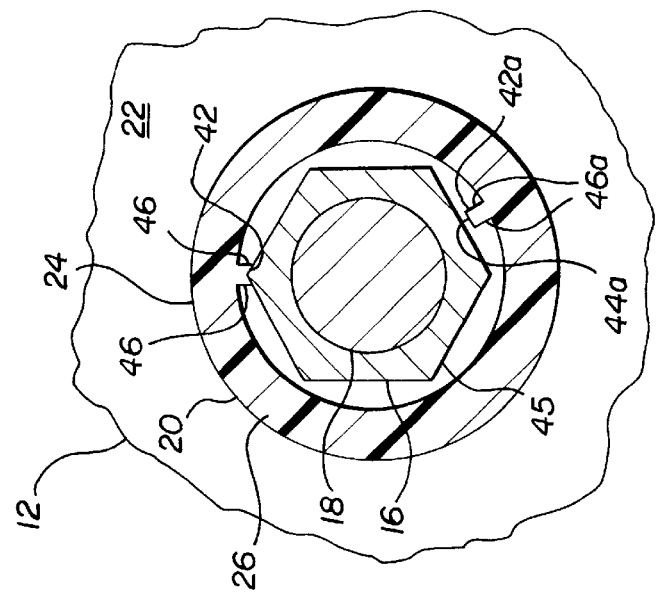
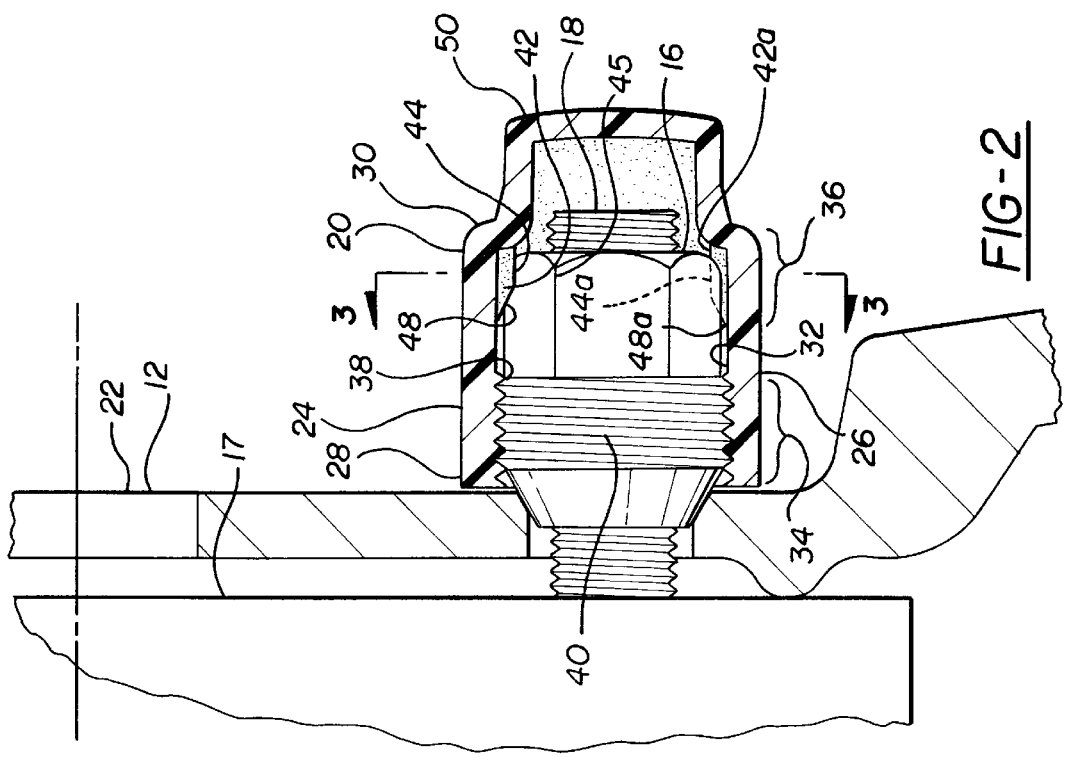

LUG CAP HAVING RETENTION DETENTS

BACKGROUND OF THE INVENTION

1. Field of the Invention

The invention relates to ornamentation for vehicular wheels. More specifically, the invention relates to a lug cap having retention detents to retain the lug caps on the lug nuts.

2. Description of the Related Art

Wheels are often adorned with ornamentation to make them more aesthetically pleasing. One wheel, the aluminum wheel, requires little ornamentation as it can be manufactured having a finish that requires little attention.

The aluminum wheel does not, however, have a counterpart lug nut. More specifically, the lug nut has remained a steel product. A lug cap must be used to cover the steel lug nut to allow it to provide the desired aesthetic appearance. Lug caps are retained on the lug nut through various means. It is difficult to design a retention system for the lug cap because it must not interfere with the overall design of the wheel and must result in little body and/or weight added to the overall design. This light-weight feature, coupled with the extreme harsh environment in which the lug caps exist, make it difficult to design a lug cap that will be retained on the lug nut.

SUMMARY OF THE INVENTION

A lug cap covers a lug nut having an outer lug nut surface and an outer threaded portion. The lug cap includes a cylindrical body having an inner wall and an outer wall. The cylindrical body extends between a nut engaging end and a distal end. The lug cap also includes a cover closing the distal end. An inner thread is fixedly secured to a first portion of the inner wall of the cylindrical body. The inner thread engages the outer threaded portion of the lug nut. A detent extends along a second portion of the inner wall of the cylindrical body. The detent engages the lug nut when the lug cap is rotated over the lug nut such that the inner thread of the lug cap engages the outer threaded portion of the lug nut.

BRIEF DESCRIPTION OF THE DRAWINGS

Advantages of the invention will be readily appreciated as the same becomes better understood by reference to the following detailed description when considered in connection with the accompanying drawings, wherein:

FIG. 2 is a top view of one embodiment of the invention; and

FIG. 3 is a cross-sectional side view partially cut away of one embodiment of the invention securing a lug cap to a lug nut.

DETAILED DESCRIPTION OF THE PREFERRED EMBODIMENTS

Figure 1:
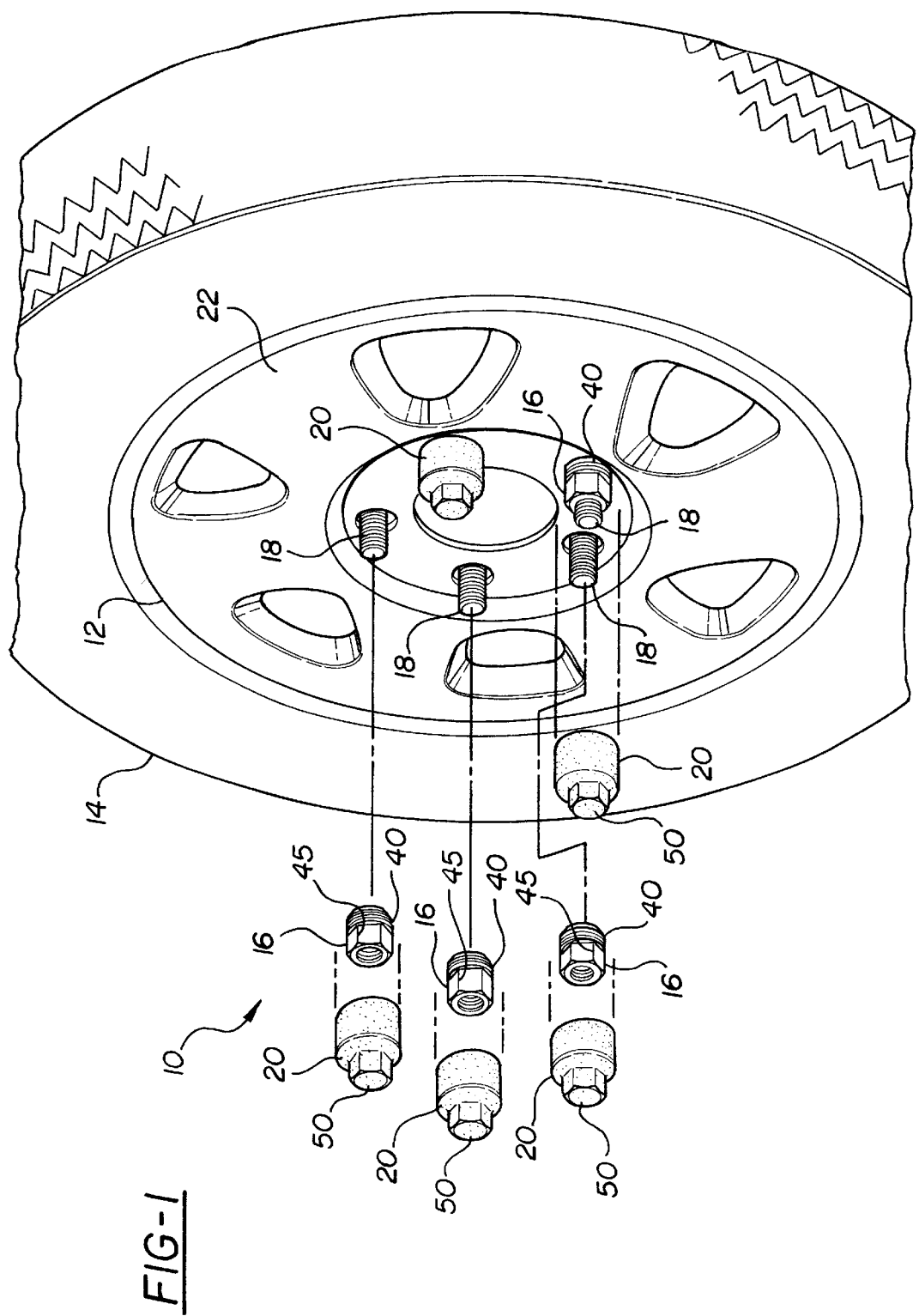
FIG. 1 is an exploded perspective view of a lug cap according to the invention with respect to a lug nut and a vehicle wheel.

Referring to the Figures, a wheel assembly is generally indicated at 10. The wheel assembly 10 includes a wheel 12, a tire 14 and a plurality of lug nuts 16. The lug nuts 16 secure the wheel 12 to a wheel hub 17 by being secured to a plurality of lug studs 18. The lug nuts 16 are secured to the lug studs 18 through a threading engagement therebetween.

The invention, a lug cap, is generally indicated at 20. The lug cap 20 is used to decoratively cover the lug nuts 16. The lug cap 20 improves the look of the lug nut 16 by covering it. The lug cap 20, unlike the lug nuts 16, may be fabricated from a material other than steel. This allows the lug cap 20 to have an improved finish over the steel lug nuts, avoiding the expense of finishing the steel nuts, or to have a finish that matches the finish of an outboard surface 22 of the wheel 12. The finish on an outer wall 24 of the lug cap 16 may complement the finish of the wheel 12. In many instances, the finish on an outer wall 24 of the lug cap 16 will match the finish of the outboard surface 22 of the wheel 12.

The lug cap 20 includes a cylindrical body 26. The cylindrical body 26 extends between the nut engaging end 28 and a distal end 30. The cylindrical body 26 defines an inner wall 32 and the outer wall 24 of the lug cap 20. The inner wall 32 is divided into at least two portions 34, 36. The first portion 34 of the inner wall 32 is disposed adjacent to and spaced from the nut engaging end 28. The first portion 34 includes an inner thread 38. The inner thread 38 is designed to engage an outer thread 40 of the lug nuts 16. The threading engagement between the inner 38 and outer 40 threads secures the lug cap 20 to the lug nut 16.

The second portion 36 of the inner wall 32 is disposed between the first portion 34 and the distal end 30. In the preferred embodiment, the first 34 and second 36 portions of the inner wall 32 are mutually exclusive. It should be appreciated by those skilled in the art that the two portions 34, 36 may, in some designs, extend into each other or overlap.

The second portion 36 of the inner wall 32 includes one or more detents 42. The detent 42 is designed such that a force required to move the lug cap rotationally with respect to the lug nut 16 will have to be great. This force is greater than the force that may be generated to overcome the frictional forces created by the inner 38 and outer 40 threads. The detent 42 will, therefore, necessitate a greater force to loosen and/or tighten the lug caps 20 than that which is required by the lug caps of the prior art.

Each detent 42 is generally rectangular in shape and extends coaxially with the cylindrical body 26. The detent 42 has a top surface 44 that extends generally parallel to the inner wall 32 at a height sufficient to engage the lug nut 16 at the points 45 of its hexagonal cross section. The detent 42 also includes two side surfaces 46 that extend between the inner wall 32 and the top surface 44. The two side surfaces 46 are generally perpendicular to the inner wall 32.

The detent 42 also includes an engaging surface 48. The engaging surface 48 extends from the inner wall 32 to the top surface 44. More specifically, the engaging surface 48 has a height equal to the height of the top surface 44 at the portion of the engaging surface 48 that abuts the top surface 44 and has a minimal height at the portion of the engaging surface 48 that is disposed adjacent the inner thread 38. The engaging surface 48 rises from the inner wall 32 at an incline. Therefore, the profile of the detent 42 is small starting at a portion disposed adjacent the inner thread 38 and increases until it plateaus at the top surface 44. In the preferred embodiment, the detent 42 is a solid structure. It may be appreciated by those skilled in the art that the detent 42 may be hollow. In yet another alternative embodiment, the detent may be fabricated from two ribs having a profile matching that of the detent 42. In this alternative embodiment, the top surface 44 and the engaging surface 48 would be replaced by the top edges of the ribs. In other words, the edges of the ribs would define planes that would match the top surface 44 and the engaging surface 48.

The lug cap 20 also includes a cover 50 that closes the distal end 30 of the cylindrical body 26. The lug cap cover 50 hides the lug nut 16 from view. The detents 42 may extend into the cover 50 or end proximal thereto.

In the embodiment shown in the Figures, two detents 42, 42a are shown. Each of these two detents 42, 42a extend along the inner wall axially and parallel with a longitudinal axis defined by the cylindrical body 26. Further, the second detent 42a extends along the inner wall 32 at a position other than a position being a multiple of sixty degrees from the detent 42. More specifically, the detents 42, 42a are positioned within the cylindrical body 26 such that they are not positioned apart by a multiple of sixty degrees. This ensures that the second detent 42a will be operational if a portion of the lug nut 16 passes by the detent 42 after it has been engaged thereby. This prevents the lug nut 16 from rotating sixty degrees before it engages the detents 42, 42a again. Further, if the user were to leave the lug cap 20 in a rotational position where the detent 42 has been positioned exactly upon a lug nut point 45, with time, temperature and load, plastic parts would exhibit an inelastic deformation which would permanently reduce the detent force of that particular detent. In this case, the second detent 42a would serve to perform the function.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A lug cap for decoratively covering a lug nut having an outer lug nut surface and an outer threaded portion, said lug cap comprising:

a cylindrical body having an inner wall and an outer wall extending between a nut engaging end and a distal end;

a cover closing said distal end;

an inner thread fixedly secured to a first portion of said inner wall of said cylindrical body for engaging the outer threaded portion of the lug nut; and a detent extending along a second portion of said inner wall of said cylindrical body and radially inward to engage an axially extending edge of the lug nut, said detent engaging the lug nut when said lug cap is rotated over the lug nut such that said inner thread of said lug cap engages the outer threaded portion of the lug nut.

2. A lug cap as set forth in claim 1 wherein said first and said second portions of said inner wall are mutually exclusive of each other.

3. A lug cap for decoratively covering a lug nut having an outer lug nut surface and an outer threaded portion, said lug cap comprising:

a cylindrical body having an inner wall and an outer wall extending between a nut engaging end and a distal end;

a cover closing said distal end;

an inner thread fixedly secured to a first portion of said inner wall of said cylindrical body for engaging the outer threaded portion of the lug nut;

a detent extending along a second portion of said inner wall of said cylindrical body, said detent engaging the lug nut when said lug cap is rotated over the lug nut such that said inner thread of said lug cap engages the outer threaded portion of the lug nut; and wherein said detent includes an engaging surface for engaging the lug nut and a top surface.

4. A lug cap as set forth in claim 3 wherein said engaging surface extends from said inner wall to said top surface at an incline.

5. A lug cap as set forth in claim 4 including a second detent wherein said second detent extends along said inner wall at a position other than in a location a multiple of sixty degrees apart from said detent.

6. A lug cap for decoratively covering a lug nut having an outer lug nut surface and an outer threaded portion, said lug cap comprising:

a cylindrical body having an inner wall and an outer wall extending between a nut engaging, end and a distal end;

a cover closing said distal end;

an inner thread fixedly secured to a first portion of said inner wall of said cylindrical body for engaging the outer threaded portion of the lug nut; and a plurality of detents extending axially along a second portion of said inner wall of said cylindrical body and radially inward to an axially extending edge of the lug nut, wherein one of said plurality of detents extends along said inner wall at a position other than a position in a location a multiple of 60 degrees apart from another of said plurality of detents.

7. A lug cap as set forth in claim 6 wherein said first and said second portions of said inner wall are mutually exclusive of each other.

8. A lug cap for decoratively covering a lug nut having an outer lug nut surface and an outer threaded portion, said lug cap comprising:

a cylindrical body having an inner wall and an outer wall extending between a nut engaging end and a distal end;

a cover closing said distal end;

an inner thread fixedly secured to a first portion of said inner wall of said cylindrical body for engaging the outer threaded portion of the lug nut;

a plurality of detents extending along a second portion of said inner wall of said cylindrical body wherein one of said plurality of detents extends along said inner wall at a position other than a position in a location a multiple of 60 degrees apart from another of said plurality of detents; and wherein each of said detents include an engaging surface for engaging the lug nut.

9. A lug cap as set forth in claim 8 wherein said engaging surface extends from said inner wall to said top surface at an incline.

* * * * *

UNITED STATES PATENT AND TRADEMARK OFFICE
CERTIFICATE OF CORRECTION

PATENT NO.    : 6,318,942 B1  
DATED         : November 20, 2001  
INVENTOR(S)   : Ted John Wieczorek Page 1 of 1

It is certified that error appears in the above-identified patent and that said Letters Patent is hereby corrected as shown below:

<u>Title page,</u>  
References not listed -- 5,842,749 and 5,918,946 --.

<u>Column 4,</u>  
Line 5, "engaging, end" should read -- engaging end --.  
Line 12, "to an" should read -- to engage an --.

Signed and Sealed this

Twenty-fifth Day of June, 2002

*Attest:*

*Attesting Officer*

JAMES E. ROGAN  
*Director of the United States Patent and Trademark Office*